United States Patent [19]

Koch et al.

[11] 4,340,292
[45] Jul. 20, 1982

[54] PHOTOGRAPHIC APPARATUS FOR USING ROLL FILMS

[75] Inventors: Carl Koch, Im Santenbühl, Stetten; Rolf Meyer, Schaffhausen; Richard Zehnder, Eschenz, all of Switzerland

[73] Assignee: Carl Koch, Stetten, Switzerland

[21] Appl. No.: 265,612

[22] Filed: May 20, 1981

[30] Foreign Application Priority Data

May 22, 1980 [DE] Fed. Rep. of Germany ....... 3019563

[51] Int. Cl.³ .......................... G03B 17/26; G03B 1/04
[52] U.S. Cl. ..................................... 354/275; 242/71.1
[58] Field of Search .................. 354/159, 216, 275; 242/71.1, 71.2

[56] References Cited

U.S. PATENT DOCUMENTS

| | | | |
|---|---|---|---|
| 461,306 | 10/1891 | Blair | 242/71.1 |
| 1,036,385 | 8/1912 | Vale | 354/275 X |
| 1,213,694 | 1/1917 | Schultz | 354/216 |
| 2,669,155 | 2/1954 | Brow | 242/71.2 X |
| 3,548,728 | 12/1970 | Ariyasu et al. | 354/216 |
| 3,666,361 | 5/1972 | Pankow et al. | 354/275 X |
| 3,918,075 | 11/1975 | Horn et al. | 354/275 X |
| 4,219,266 | 8/1980 | Carter | 354/275 |

Primary Examiner—Donald A. Griffin
Attorney, Agent, or Firm—Watson, Cole, Grindle & Watson

[57] ABSTRACT

A roll film cassette facilitating the loading of film in ordinary light conditions without risk of exposure comprises a housing, a window adjacent one end of the housing, a film supply spool for unexposed film and a take-up spool for exposed film at the window end of the housing, and a reversing roller at the opposite end of the housing. The two spools are incorporated into a common spool-holder unit bodily attachable in and removable from the housing. The parts of the spool-holder unit for mounting the supply spool include a light-tight sleeve with an opening for the insertion and removal of the spool. The opening has a hinged door-like lid and an axial slot for the accommodation of a leader portion of the film.

16 Claims, 8 Drawing Figures

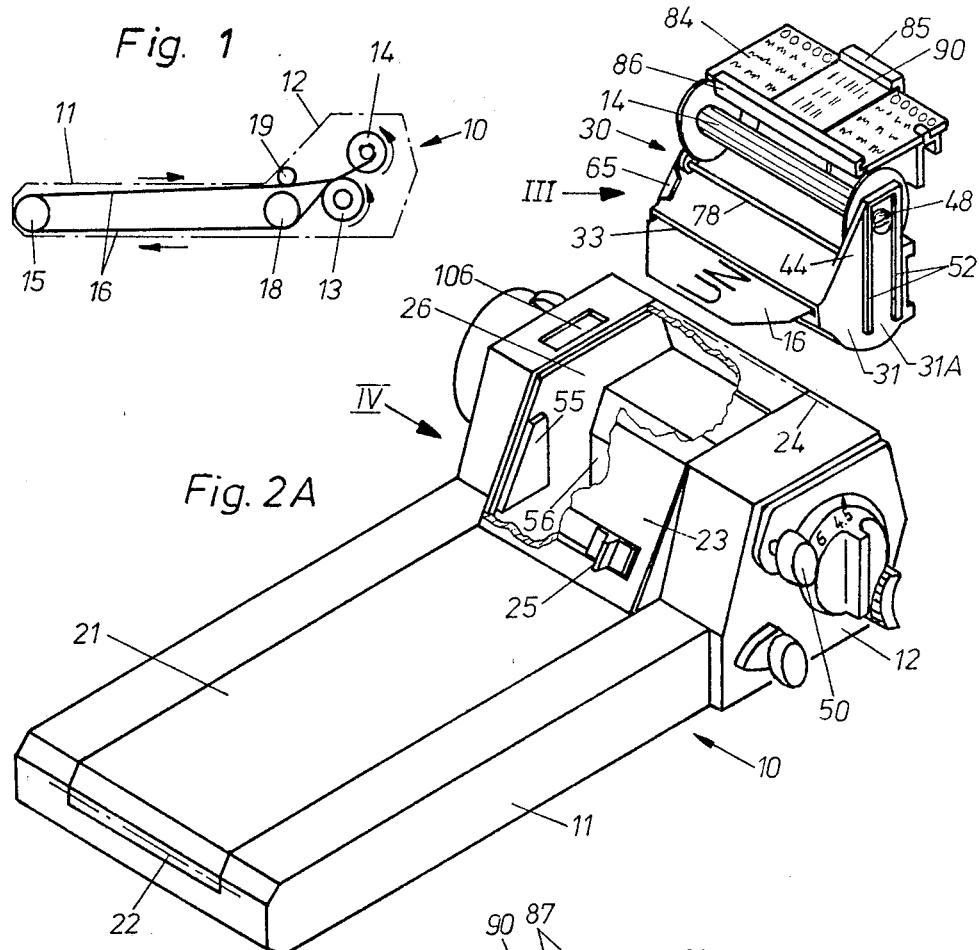
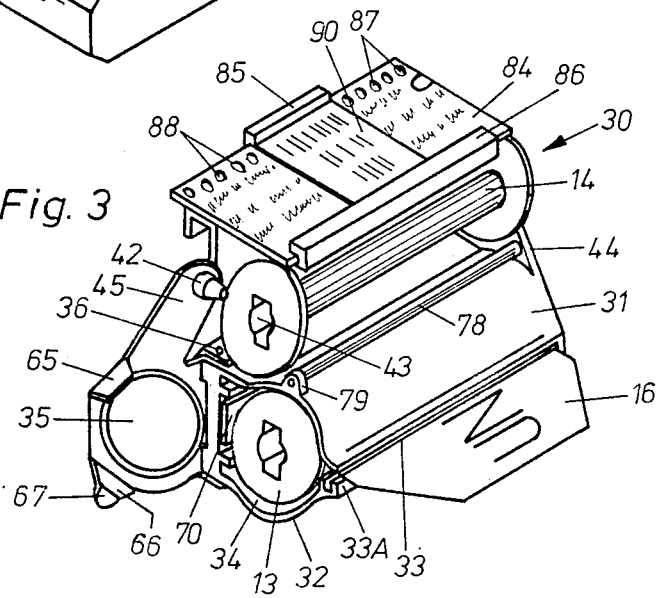

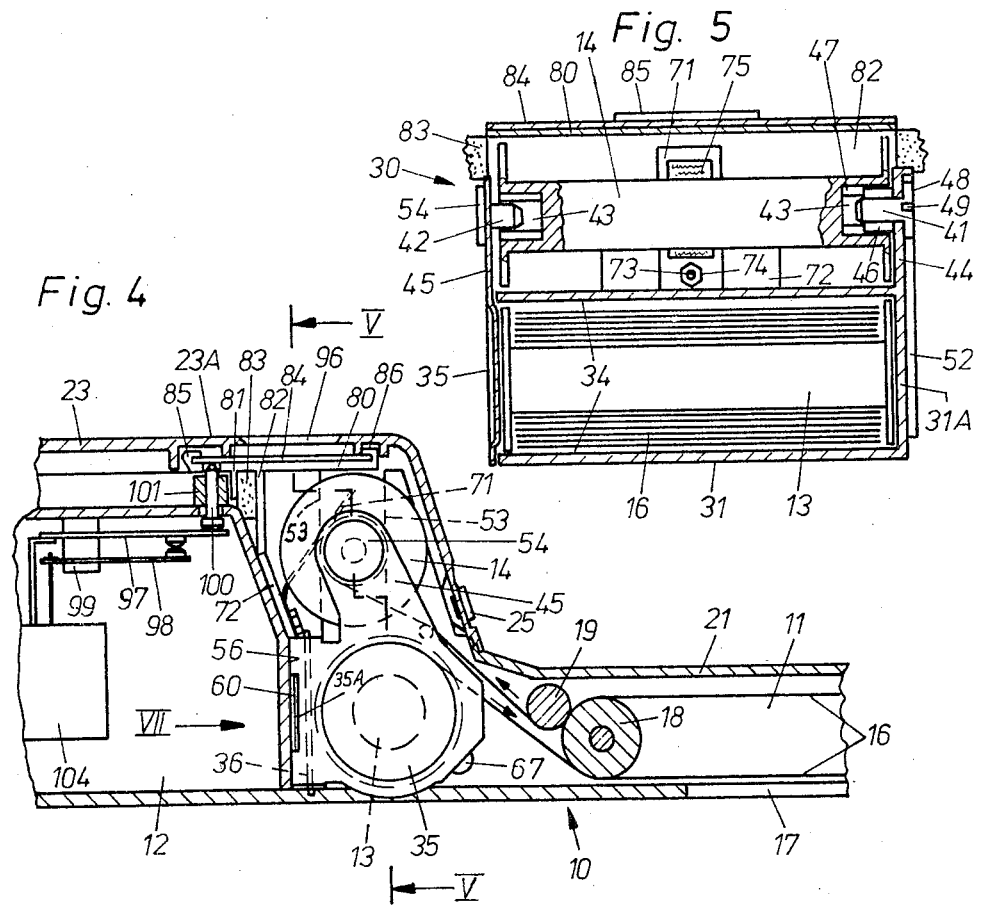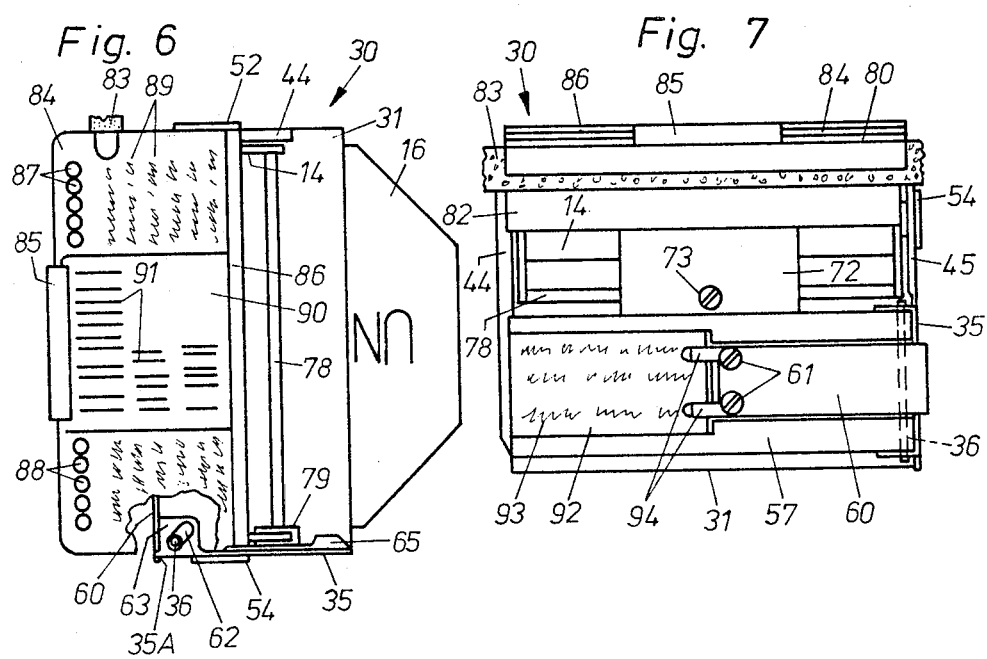

PHOTOGRAPHIC APPARATUS FOR USING ROLL FILMS

The present invention relates to a photographic apparatus for using roll films, having a housing comprising a picture window, in the interior of which there are arranged at one and the same end of the picture window a device for the rotatable mounting of a supply spool with unexposed roll film stock and a device for the rotatable mounting of a take-up spool for winding on the roll film stock after exposure, while at the opposite end of the picture window there is only a reversing roller for the roll film stock.

An apparatus of this type can be for example a photographic camera. However it can preferably be a roll film cassette for attachment to the rear wall of a photographic ground-glass focussing camera. A roll film cassette of this kind is known for example from U.S. Pat. No. 4,180,314 (C. Koch et al). The roll film cassette as described in this patent is usable as an ordinary sheet film cassette on what is referred to as a universal professional camera, in that the part of this roll film cassette comprising the picture window and containing the reversing roller is pushed in between the rear wall of the camera and a frame carrying the focussing screen, and the focussing screen frame, subject to the influence of springs, yields to the rear against the spring action. Then the inserted roll film cassette is held fast on the camera rear wall in the focal plane by the force of the springs.

The ordinary commercial roll films such as are known for example under the names "120" and "220" comprise, as well as the light-sensitive film, a light-impermeable paper strip which forms what are called the leader and trailer, to permit loading and unloading of a camera or roll film cassette in daylight, without undesired incidence of light upon the light-sensitive film. The standardised length of the leader serving for light protection is sufficiently large when the supply spool is arranged at the one end with the take-up spool at the opposite end of the picture window of the camera or the roll film cassette. If, on the other hand, as in a roll film cassette of the type mentioned above, both the supply spool and the take-up spool lie at one and the same end of the picture window, the leader must be conducted not only over the picture window to the opposite end thereof but also back again to the take-up spool. The length of the leader of ordinary commercial roll films is of relatively small dimensions for this case. Especially if the picture window has a relatively large length dimension, for example for panoramic format 6×12 cm., the great danger exists, in the daylight loading of the roll film cassette, that light may fall upon the initial part of the film on the supply spool.

In order to avoid the danger of undesired light entry, attempts have already been made to fit some type of light-excluding curtain next to the supply spool, but this solution is not reliably capable of protecting the film on the supply spool against light entry, especially during sunlight loading and if there is a picture window of large format. Such a light-excluding curtain in the cassette moreover makes access more difficult to the device for the fitting of the supply spool, so that the loading of the cassette is troublesome, complicated and time-consuming.

It is therefore an object of the present invention to produce a photographic apparatus of the aforedescribed type which is capable of light-proof loading with a roll film of the ordinary commercial type in daylight and even when a panoramic type picture window is present, without the application of special care.

Accordingly, in the photographic apparatus according to the invention the devices for the rotatable mounting of the supply and take-up spools are provided on a common spool-holder unit which is detachably and exchangeably arranged in the housing of the apparatus, and the device for the mounting of the supply spool further comprises a light-tight sleeve having an opening closable by a lid, for the axial insertion and withdrawal of the supply spool, the sleeve being provided on its circumferential wall with a slot for the passage of the roll film stock, which slot has an open end adjoining the opening of the sleeve.

This arrangement renders it possible to take the spool-holder unit out of the apparatus and pre-load it easily with a roll film, in that the supply spool wound with the roll film stock is pushed into the light-tight sleeve provided for this purpose and in this operation the forward end part of the light-protective leader is introduced into the slot of the sleeve so that after the closing of the sleeve the leader can be grasped from the exterior and drawn out in the requisite length. The spool-holder unit thus preloaded can then be conveniently inserted into the space in the apparatus provided for this purpose, whereafter the leader of the roll film is laid over the picture window and the reversing roller arranged at the opposite end of the picture window and drawn as far as the take-up spool. Since the supply spool and the roll film wound on it are situated within the light-tight sleeve of the spool-holder unit and practically no light can enter through the slot of the sleeve, the light-sensitive film on the supply spool is effectively protected against light entry, even if almost the whole length of the leader is drawn out of the slot. Thus practically the whole film leader is available for loading the apparatus, without danger of undesired entry of light on to the light-sensitive film. The apparatus can therefore be safely loaded with a roll film in daylight and even in sunlight.

The embodiment according to the invention further renders it possible to pre-load two or more spool-holder units each with a roll film, so that then loading of the photographic apparatus can be carried out in each case conveniently and quickly, using these pre-loaded spool-holder units.

Further advantages and details of the objects of the invention may be seen from the following description of a preferred example of an embodiment with reference to the drawings, in which the invention is illustrated purely by way of example.

FIG. 1 is a diagrammatic representation of the course of a roll film from the supply spool to the take-up spool in a roll film cassette for a universal ground-glass focussing camera, the cassette being shown in side elevation in phantom outline;

FIGS. 2A and 2B are perspective views of the roll film cassette and of the spool-holder unit pre-loaded with a roll film, respectively, the latter being shown taken out of the cassette and the cassette being shown partially broken away;

FIG. 3 shows, likewise in perspective representation but on an enlarged scale of reproduction compared with FIG. 2B, the pre-loaded spool-holder unit, in elevation in the direction of the arrow III in FIG. 2B;

FIG. 4 is a longitudinal sectional view taken through a part of the roll film cassette with the inserted spool-holder unit in side elevation as indicated by the arrow IV in FIG. 2A;

FIG. 5 is a cross-sectional view taken along the line V—V in FIG. 4 through the pre-loaded spool-holder unit alone;

FIG. 6 is a plan view of the pre-loaded spool-holder unit; and

FIG. 7 represents the spool-holder unit in a view in the direction of the arrow VII in FIG. 4.

Now reference will be made firstly to FIG. 1. The roll film cassette 10, shown in phantom outline, for a universal ground-glass focussing camera comprises a flat main part 11 with the external dimensions of an ordinary sheet film cassette, and a widened end part 12 in which a roll film supply spool 13 and a take-up spool 14 are mounted. The cassette part 12 further contains a device (not shown) for driving the take-up spool 14. The flat main part 11 of the cassette 10 contains at the end remote from the end part 12 a reversing roller 15 for the roll film stock 16 which is drawn from the supply spool 13 and wound on to the take-up spool 14. On the lower side in FIG. 1 of the flat main part 11 of the cassette there is a picture window 17, partially visible only in FIG. 4, along which the roll film stock 16 is guided. The picture window is closable in known manner by means of a light-excluding slider (not shown) in order to prevent entry of light to the roll film stock 16 when the cassette 10 is not fitted in the readiness position on a camera. Two further rollers 18 and 19 serve for the guidance of the roll film stock 16 in the region of the transition between the flat main part 11 and the widened end part 12 of the cassette. Thus far the roll film cassette as described is in conformity with the prior art.

In FIG. 2A the flat main part 11 and the widened end part 12 of the roll film cassette 10 are seen in perspective. The back of the flat main part 11, turned upwards in FIG. 2A, is provided with a hinge-open lid 21 which is pivotable about a hinge spindle indicated at 22. The widened end part 12 also has a hinge-open lid 23 which is pivotable about a hinge spindle indicated at 24. With the aid of a slide catch 25 arranged on the lid 23 the two lids 21 and 23 can be locked in the closed position as illustrated. Within the widened end part 12 of the cassette 10 there is a compartment 26 for the reception of a spool-holder unit 30 (FIG. 2B) in which the aforementioned supply spool 13 and the take-up spool 14 are rotatably mounted, as explained in greater detail below.

The spool-holder unit 30 has a light-tight sleeve 31 for the reception of the supply spool 13 wound with unexposed roll film stock 16. At the end of the sleeve 31 facing the observer in FIG. 3, an opening 32 is provided for the axial insertion and withdrawal of the supply spool 13. The circumferential wall of the sleeve 31 is provided with a slot 33 for the passage of the roll film stock 16. The end 33A of the slot 33 lying adjacent the opening 32 is open, so that when the supply spool 13 is pushed into the sleeve 31 the leader of the roll film stock 16 can be simultaneously pushed transversely into the slot 33. The interior of the sleeve 31 has a substantially cylindrical but partially also prismatic form and comprises inner guide faces 34 for the periphery of the end flanges of the supply spool 13 (FIGS. 3 and 5). For the light-tight closing of the opening 32 of the sleeve 31 a lid 35 is provided which is pivotably mounted on the sleeve 31 by means of a hinge spindle 36. The hinge spindle 36 is arranged on the side of the sleeve 31 diametrically opposite the slot 33 and extends at right angles to the longitudinal direction of the slot 33, as may best be seen from FIG. 3. The sleeve 31, the guide faces 34 and the lid 35 together form the device for the rotatable mounting of the supply spool 13.

According to FIG. 5 the take-up spool 14 is rotatably mounted with the aid of two pivot pins 41 and 42 which engage in opposite ends of an axial bore 43 of the take-up spool and are arranged each on a side member 44 and 45 respectively connected with the sleeve 31. The one side member 44 is situated adjacent the firmly closed end 31A of the sleeve 31 remote from the lid 35 and is formed integrally therewith and therefore fixed. The other side member 45 is formed as an extension of the lid 35 integrally therewith and therefore is movable together with the lid 35. FIG. 3 shows how in the opening of the lid 35 the movable side member 45 is pivoted therewith and how then the pivot pin 42 comes out of engagement with the take-up spool 14 so that the latter can be replaced conveniently. Conversely, on closure of the lid 35 the pivot pin comes into engagement with the take-up spool 14. The pivot pins 41, 42 and the side members 44, 45 together form the device for the rotatable mounting of the take-up spool 14.

While the pivot pin 42 is firmly connected with the movable side member 45 the other pivot pin 41 is rotatably mounted in the fixed side member 44. The end part of the rotatable pivot pin 41 which engages in the take-up spool 14 and faces the opposite pivot pin 42 has radially protruding vanes 46 which are intended to come into engagement with corresponding radial apertures or slots 47 of the bore 43 or of the relevant end flange of the take-up spool 14. The opposite, outer end of the rotatable pivot pin 41 is formed as a coupling piece 48 and for this purpose has a transverse groove 49. The coupling piece 48 is intended to be brought into coupling engagement with a matching countercoupling piece of the device accommodated in the widened end part 12 of the roll film cassette for driving the take-up spool 14. In FIG. 2A an operating knob 50 movable in the axial direction by a limited distance can be seen, which must be pulled out to release the coupling engagement between the drive device and the take-up spool 14 and pushed in to bring about the coupling engagement.

At the closed end 31A of the sleeve 31 and on the fixed side member 44 there are externally provided two parallel-extending guide ribs 52 (FIGS. 2B and 5) which slide along corresponding guide faces 53 (FIG. 4) in the compartment 26 of the widened cassette part 12 when the spool-carrier unit 30 is introduced into the compartment 26 or withdrawn therefrom. Externally on the movable side member 45 there is situated a guide element 54 of disc form (FIGS. 4 and 5) which in the insertion of the spool-carrier unit into the compartment 26 slides along a guide face 55 (FIG. 2A) in the cassette part 12. Moreover a wall part 56 of the compartment 26 is formed as a guide face for the outer side 57 (FIG. 7) of the sleeve 31 remote from the slot 33. These guide elements and guide faces of the spool-carrier unit 30 on the one hand and of the compartments 26 on the other are so formed and arranged that the spool-carrier unit 30 can be pushed into the compartment 26 and withdrawn from it in a direction at right angles to the axes of the supply spool 13 and of the take-up spool 14 and perpendicularly to the plane of the picture window 17 of the roll film cassette, and that together with the lid 23 and the walls of the cassette part 12 they ensure a specific position of the spool-carrier unit 30 inserted into the compartment 26, as shown by FIG. 4.

According to FIGS. 4, 6 and 7 with the pivotable lid 35 there is associated a leaf spring 60 which is secured to the outside 57 of the sleeve 31 by means of screws 61 and bears with its free end part under the influence of its elasticity against an edge 35A of the lid 35. Thus a torque is exerted upon the lid 35 seeking to hold the lid in its position closing the opening 32 of the sleeve 31. However the lid 35 can be pivoted outwards against the influence of the leaf spring 60, the edge 35A sliding along the leaf spring. When the lid 35 is pivoted outwards through an angle lying between 45° and 90° the leaf spring 60 through the mentioned edge 35A exerts an opposite torque upon the lid 35 whereby the lid is pushed into an open position pivoted outwards through 90°.

In FIG. 6 it can be seen that the one end of the hinge spindle 36 penetrates an elongated hole 62 in a tab 63 provided for the pivotable mounting of the lid 35, which tab is made in one piece with the lid 35 and angled off through 90°. The longitudinal direction of the elongated hole 62 extends obliquely in relation to the plane of the lid 35, namely so that the force exerted by means of the leaf spring 60 upon the edge 35A of the lid 35 causes a displacement of the tab 63 in the longitudinal direction of the elongated hole 62, which displacement comprises a component directed towards the mouth of the opening 32. At the other end of the hinge spindle 36 an analogously formed tab is present with a similarly obliquely extending elongated hole. This manner of pivotable mounting of the lid 35 achieves the object that the torque caused by means of the spring 60 presses mainly the part of the lid most remote from the hinge spindle 36 against the mouth of the opening 32 and the displacement of the lid caused likewise by means of the spring 60 in collaboration with the obliquely extending elongated hole 62 also presses the part of the lid lying in the vicinity of the hinge spindle 36 against the mouth of the opening 32 and consequently the lid 35 in its closed position lies in light-tight manner on the mouth of the opening 32 on the whole circumference.

According to FIGS. 3 and 6 the lid 35 further comprises, adjacent its end remote from the hinge spindle 36, two inwardly protruding marginal tabs 65 and 66 which when the lid is in the closed position grasp externally over the circumferential wall of the sleeve 31 on both sides of the open end 33A of the slot 33. When the lid 35 is opened, that is when the marginal tabs 65 and 66 are not in contact with the circumferential wall of the sleeve 31, the slot 33 has a clear internal width which increases slightly towards the open end 33A so that the introduction of the leader of the roll film stock 16 is facilitated. The two marginal tabs 65 and 66 are, however, so shaped and arranged that when the lid 35 is in the closed position the circumferential wall parts of the sleeve 31 adjoining the slot 33 press elastically towards one another so far that the slot 33 assumes an approximately constant clear internal width over its entire length. The one marginal tab 66 further has an angled-off extension 67 (FIGS. 3 and 4) which serves as a handle for opening the lid 35. The longitudinal edges of the slot 33 are expediently each provided with a soft lining, for example of plush, for satisfactory sealing against light entry.

In the interior of the sleeve 31 there is a leaf spring 70 (FIG. 3) secured to the circumferential wall of the sleeve and abutting resiliently against the outermost turn of the roll film stock present on the supply spool 13, in order to prevent slackening of the film turns. A further leaf spring 71 (FIGS. 4 and 5) serving to brake the take-up spool 14 is secured on a web 72 issuing from the sleeve 31, for example by means of a screw 73 and a nut 74. The frictional or braking faces of the leaf springs 70 and 71 are expediently each provided with a felt or plush lining 75, as illustrated by way of example in FIG. 5.

Between the supply spool 13 and the take-up spool 14 there is also arranged a support roller 78 parallel with the mentioned spools, which roller may be seen most clearly in FIGS. 3, 4 and 6. This support roller 78 has a comparatively small diameter and is supported with its ends in the fixed side member 44 and in a bearing 79 which is made integral with the sleeve 31.

The above-mentioned web 72 carries a plate 80 which is arranged at right angles to the direction of movement of the spool-carrier unit 30 in its insertion into the compartment 26, as shown by FIGS. 4, 5 and 7. The under side of the plate 80 facing the spools 13 and 14 is stiffened by two spaced apart ribs 81 and 82 extending parallel to the axes of the spools 13 and 14, between which ribs there is inserted an elastically deformable foam rubber strip 83 for light sealing. This foam rubber strip is not illustrated in FIGS. 2B and 3 for the sake of greater clarity. The upper side of the plate 80 remote from the spools 13 and 14 carries a removable and replaceable code plate 84 which is held fast by two mutually opposite engaging strips 85 and 86 of the plate 80, as may be seen especially from FIGS. 4 and 6. The code plate 84 is provided with two groups of code perforations 87 and 88 (FIG. 6) each comprising for example one to five holes. The one group 87 represents in coded form for example the light-sensitivity of the roll film stock 16 present on the supply spool 13, while the other group 88 indicates likewise in coded form for example the length of the exposable film strip of the roll film stock, that is to say for example whether it is a matter of a roll film of type "120" or "220". Of course additional parameters of the roll film stock can also be represented in coded form by means of the perforations 87 and 88, for example whether it is negative or slide stock or black and white or colour film. The code plate 84 at the same time serves as carrier of visually perceptible information 89 which can be applied by printing and/or hand-writing.

According to FIG. 6 between the two engaging strips 85 and 86 a piece of cardboard 90 is clamped which is for example a part of the sales packing of the roll film situated on the spool 13 and discloses printed indications 91 as to the manufacturer and the nature of the relevant roll film stock. FIG. 7 shows the further piece of cardboard or paper 92, preferably carrying information 93 applied in hand-writing, which can be fitted to the outside 57 of the sleeve 31 remote from the slot 33, and is clamped under resilient tongues 94 which are extensions of the leaf spring 60.

When the spool-carrier unit 30 is inserted into the compartment 26 of the cassette part 12 provided for it and the lid 23 is closed, as FIG. 4 shows, the code plate 84 lies parallel with a part 23A of the lid 23. This part 23A has a window 96 through which the visually perceptible information 89 and 91 on the code plate 84 and the cardboard piece 90 are visible and can be read. Along the circumferential edges of the window 96 on the inner side of the lid 23 there are arranged foam-rubber strips (not shown in the drawing) to seal against light entry.

In the widened cassette part 12 there are several pairs of electric contact blades 97 and 98, of which only one pair is visible in FIG. 4. All the contact blades 97 and 98 are arranged on an insulating strip 99 secured in the cassette part 12. The one contact blade 97 of each pair 97, 98 co-operates with the one end of a feeler pin 100 which is longitudinally displaceably guided in a fitting bore of a guide strip 101. The other end of the feeler pin 100 passes through one of the code holes 87 or 88 of the code plate 84, or if there is no code hole at the point concerned it strikes against the under-side of the code plate 84. In the latter case the contact blade 97 is pressed by means of the feeler pin 100 against the associated other contact blade 98 and an electric contact is closed between the two blades 97 and 98, whereas in the former case the contact blade 97 is moved away as a result of its own elasticity from the other contact blade 98 so far that no electric contact exists between the blades 97 and 98. In all there are as many contact blade pairs 97 and 98 and feeler pins 100 present as the code plate 84 can comprise holes 87 and 88 in the maximum case, and each feeler pin 100 is situated at a point where one of the holes 87 and 88 could lie. According to the number and arrangement of the perforations 87 and 88 in the code plate 84, in the insertion of the spool-carrier unit 30 into the compartment 26 a different number of pairs or different pairs of contact blades 97, 98 are brought into contact and thus the information given by the perforations 87 and 88 in coded form is converted automatically into corresponding electrical switch conditions. The contact blades 97, 98 are connected to an electric or electronic device 104 which is connectable through plug connectors and cables (not shown) with further external electric or electronic devices. The device 104 serves for the one part for controlling the aforementioned device for driving the take-up spool 14 for film winding or film feed between the successive photographic exposures, in adaptation to the size of the picture window 17 and the length of the light-sensitive film of the roll film stock 16, and preferably also for controlling an indicator device 106 (FIG. 2A) to indicate the number of photographic exposures already exposed and/or to indicate the length of the still unexposed film. On the other hand, the device 104 in combination with the aforementioned external electric or electronic devices also serves for ascertaining exposure data or for controlling the exposure of the light-sensitive film of the roll film stock, taking account of the sensitivity of the film in the spool-carrier unit 30.

The manner of use and operation of the roll film cassette 10 as described and of the associated spool-carrier unit 30 is briefly as follows:

For the loading of the roll film cassette 10 with fresh roll film stock 16 the lids 21 and 23 are opened, whereafter the spool-carrier unit 30 can be lifted out of the compartment 26 of the widened cassette part 12. Now the lid 35 on the sleeve 31 is pivoted into its open position in order to expose the opening 32 of the lid 31 and the open end 33A of the slot 33. A spool 13 with fresh roll film stock 16 wound on it is now pushed through the opening 32 into the sleeve 31, while at the same time the initial part of the light-excluding leader paper of the roll film is pushed into the slot 33 through its open end 33A. Then an empty spool is fitted as take-up spool 14 on the rotatable pivot pin 41, as shown by FIG. 3. When this has taken place the lid 35 is pivoted into its position closing the opening 32 in which it is held under the influence of the resilience of the leaf spring 60. On closure of the lid 35 the pivot pin 42 also automatically comes into engagement with the axial bore 43 of the take-up spool 14. The spool-carrier unit 30 is now completely pre-loaded with fresh roll film stock. It remains only to examine whether the code plate 84 is suitable for the roll film stock in the sleeve 31. If this should not be the case the code plate 84 must be replaced by another suitable one. If desired a section 90 of the box in which the roll film was contained can also be clamped fast on the code plate 84 by means of the engaging strips 85 and 86 in order to obtain an additional visually perceptible characterisation of the spool-carrier unit 30 as regards the charged roll film stock.

The spool-carrier unit 30 pre-loaded in the described manner with roll film stock 16 is inserted into the compartment 26 of the widened cassette part 12, in which operation the characteristic parameters of the roll film stock 16 represented by the perforations 87 and 88 of the code plate 84 are automatically transferred into the electric or electronic device 104. Next the paper leader of the roll film stock is drawn as far out of the slot 33 as is necessary in order to be able to place the leader along the path illustrated diagrammatically in FIG. 1 underneath the guide roller 18, around the reversing roller 15 and underneath the guide roller 19 to the take-up spool 14. The leading end of the paper leader is now secured to the take-up spool 14, which can take place without difficulty because the take-up spool is freely accessible. The support roller 78 prevents the roll film stock 16 from rubbing on the exterior of the sleeve 31. Finally the two lids 21 and 23 of the cassette 10 are closed. Thus the loading operation is terminated.

Because the unexposed film wound on the supply spool 13 in the sleeve 31 is protected against light entry as long as only the paper leader of the roll film stock 16, but not yet the light-sensitive film, is drawn out of the slot 33, in the loading of the roll film cassette 10 there is no danger of the film being spoiled by undesired light entry.

The unloading of the cassette 10 after exposure of the entire roll film stock is especially simple. Firstly the take-up spool 14 is rotated in known manner by means of the associated drive device until the entire paper trailer of the roll film stock is wound on to the spool 14. Then the lids 21 and 23 of the cassette are opened and the spool-carrier unit 30 is lifted out of the cassette part 12. Finally the lid 35 on the sleeve 31 is pivoted into its open position, the pivot pin 42 coming out of engagement with the take-up spool 14, so that the latter can simply be withdrawn from the opposite pivot pin 41 and taken out. This opportunity can be taken to withdraw the now empty supply spool 13 from the sleeve 31 and inserted in place of the former take-up spool 14.

It is obvious that several spool-carrier units 30 can be pre-loaded each with a roll film and inserted successively into one and the same roll film cassette 10. Thus it is rendered possible to carry out the loading of the cassette 10 quickly in each case, in that the spool-carrier unit with the already exposed roll film is simply taken out and another spool-carrier unit is inserted which is already pre-loaded with fresh roll film stock. If two or more spool-carrier units 30 are available it is also possible to pre-load them with different kinds of roll film stock, for example with black and while or coloured film stock or with shorter or longer film strips. Naturally it must be ensured here that the code plates 84 are suitable for the roll film types in question.

While the invention was explained above by the example of a roll film cassette for a ground-glass focussing universal camera, the object of the invention can however also be a roll film cassette for a different camera or even a photographic camera itself.

We claim:

1. Photographic apparatus for using roll films, comprising a housing, a picture window defined in the housing, a device for rotatably mounting a supply spool with unexposed roll film stock and a device for rotatably mounting a take-up spool for taking up the roll film stock after exposure, said devices being arranged adjacent the same end of the picture window and within said housing while at the opposite end of the picture window there is solely a reversing roller for the roll film stock, the improvement comprising a spool-holder unit which is readily detachably and replaceably arranged in said housing and which combines together said devices, light-tight sleeve means associated with said device for rotatably mounting the supply spool, an opening defined in said sleeve means for the axial insertion and withdrawal of the supply spool, and a lid for closing said opening and being mounted on the sleeve means for pivotal movement about a hinge spindle, said means having a circumferential wall in which is defined a slot for the passage of the roll film stock, the hinge spindle being arranged at a side of the sleeve means generally diametrically opposite the slot, said slot having an open end adjoining the opening of the sleeve means, and spring means secured to the sleeve means for resiliently biasing the lid to its position closing the opening of the sleeve means.

2. Photographic apparatus for using roll films, comprising a housing having a picture window, a spool-holder unit detachably and replaceably arranged in said housing, said unit including a rotatable supply spool including unexposed roll film stock, and a rotatable take-up spool for taking up the roll film stock after exposure, the film stock comprising film having a light-sensitive emulsion or coating, on one side, and a light impermeable backing sheet, on the other side, the backing sheet having a greater length than the film so as to form leading and trailing end portions for protection of the rolled film before and after exposure, said spools being arranged adjacent the same end of the picture window, a reversing roller within said housing for the roll film stock at the opposite end of the picture window, light-tight sleeve means surrounding said supply spool for rotatably supporting same, said take-up spool being disposed wholly outwardly of said sleeve means, said sleeve means including an opening to facilitate axial insertion and withdrawal of said supply spool, a lid for closing said opening, said sleeve means including a circumferential wall having a single slot through which the film exits from the supply spool, and said slot having an open end adjoining said opening to facilitate insertion into said slot of the leading end portion of the film upon the insertion of said supply spool.

3. Apparatus according to claim 1 or 2, wherein two inwardly protruding marginal tabs are provided on the lid to grasp from the outside peripheral wall parts of the sleeve means on both sides of the open end of the slot when the lid is closed.

4. Apparatus according to claim 3, wherein when the lid is open the clear internal width of the slot increases towards its open end and when the lid is closed the circumferential wall parts of the sleeve means adjoining the slot are forced resiliently towards one another by the marginal tabs of the lid such that the slot has a generally constant width over its entire length.

5. Apparatus according to claim 1 or 2, wherein said spool-holder unit includes means for replaceably mounting an information carrier which extends in a plane parallel to an outer wall of said housing and is visible and readable from the exterior through a window defined in said outer wall.

6. Apparatus according to claim 5, wherein said mounting means is adapted to form a light-tight seal adjacent the window defined in said outer wall.

7. Apparatus according to claim 1 or 2, wherein the spool-holder unit includes a detachably and replaceably arranged code-carrier member which on insertion of the spool-holder unit into said housing is effective to actuate electric coding contacts for the automatic setting of characteristic parameters of the roll film stock to an electric device for co-ordinating the exposure of the light-sensitive film of the roll film stock.

8. Apparatus according to claim 7, wherein the code-carrier member is in the form of a plate comprising an information carrier for visually perceptible individual information.

9. Apparatus according to claim 7, wherein said carrier member is adapted to form a light-tight seal adjacent the window defined in said outer wall.

10. A roll film unit for use in a photographic apparatus, comprising a rotatable supply spool with unexposed roll film stock, and a rotatable take-up spool for taking up the roll film stock after exposure, light-tight sleeve means for rotatably mounting said supply spool, an opening defined in said sleeve means for the axial insertion and withdrawal of said supply spool, a lid for closing said opening and being mounted on the sleeve means for pivotal movement about a hinge spindle, said sleeve means having a circumferential wall including a slot for the passage of the film, the spindle being arranged at a side of the sleeve means generally diametrically opposite the slot, said slot having an open end adjoining the opening of the sleeve means, and spring means secured to the sleeve means for resiliently biasing the lid to its position closing the opening of the sleeve means.

11. A roll film unit for use in a photographic apparatus, comprising a rotatable supply spool including unexposed roll film stock, and a rotatable take-up spool for taking up the roll film stock after exposure, the film stock comprising film having a light-sensitive emulsion or coating, on one side, and a light impermeable backing sheet, on the other side, the backing sheet having a greater length than the film so as to form leading and trailing end portions for protection of the rolled film before and after exposure, light-tight sleeve means rotatably supporting said supply spool, said take-up spool being disposed wholly outwardly of said sleeve means, said sleeve means including an opening to facilitate axial insertion and withdrawal of said supply spool, a lid for closing said opening, said sleeve means including a circumferential wall having a single slot through which the film exits from the supply spool, and said slot having an open end adjoining said opening to facilitate insertion into said slot of the leading end portion of the film upon the insertion of said supply spool.

12. The unit according to claim 10 or 11, wherein the lid includes two inwardly protruding marginal tabs to facilitate grasping from the outside peripheral wall parts of the sleeve means on both sides of the open end of the slot when the lid is closed.

13. The unit according to claim 12, wherein when the lid is open the clear internal width of the slot increases towards its open end and when the lid is closed the circumferential wall parts of the sleeve means adjoining the slot are forced resiliently towards one another by the marginal tabs of the lid such that the slot has a generally constant width over its entire length.

14. The unit according to claim 10 or 11, further including means for replaceably mounting an information carrier.

15. The unit according to claim 10 or 11, further including a detachably and replaceably arranged code-carrier member.

16. The unit according to claim 15, wherein the code-carrier member is in the form of a plate comprising an information carrier for visually perceptible individual information.

* * * * *